[54] COLOR PATTERN AND ALPHANUMERIC CHARACTER GENERATOR FOR USE WITH RASTER-SCAN DISPLAY DEVICES

[75] Inventors: Fumiyuki Inose, San Jose; Hirohido Endo; Akio Komatsu, both of Cupertino, all of Calif.

[73] Assignee: Hitachi, Ltd., Tokyo, Japan

[21] Appl. No.: 785,100

[22] Filed: Apr. 6, 1977

[51] Int. Cl.[2] .............................................. G06K 15/20

[52] U.S. Cl. ..................................... 340/703; 364/900

[58] Field of Search ................ 340/324 AD; 364/200, 364/900

[56] References Cited

U.S. PATENT DOCUMENTS

| | | | |
|---|---|---|---|
| 3,685,038 | 8/1972 | Flanagan | 340/324 AD |
| 3,771,155 | 11/1973 | Hayashi et al. | 340/324 AD |
| 4,026,555 | 5/1977 | Kirschner et al. | 340/324 AD |

*Primary Examiner*—David L. Trafton

*Attorney, Agent, or Firm*—Jackson & Jones

[57] ABSTRACT

A color pattern and alphanumeric character generator for use with raster-scanned CRT display devices wherein the color background patterns and the characters are generated in an integrated manner. As a result, the apparatus utilized is considerably simplified and the color pattern display obtainable is more complex and more easily varied than hitherto was possible in an apparatus of this type. The viewing area of the raster-scan CRT is divided into a matrix of character cells. Each character cell is in turn divided into a plurality of color cells, each color cell being a matrix of dot positions on the display area of the CRT. The relationship of the number of color cells in each character cell and the number of dot positions in each color cell is an even integer. A display RAM, addressed by a microprocessor, stores display information therein. The RAM is addressed by the display circuitry during the display cycle. Each address location in the RAM has a plurality of bytes associated therewith which define a particular character cell on the CRT, both as to the color pattern therein and the character therein, if any. This information is used by the color and video network of the raster-scan display to generate the composite character and color pattern signal for each scan line.

20 Claims, 11 Drawing Figures

COLOR PATTERN AND ALPHANUMERIC CHARACTER GENERATOR FOR USE WITH RASTER-SCAN DISPLAY DEVICES

BACKGROUND OF THE INVENTION

The invention relates generally to improvements in microprocessor-controlled television games and, more particularly, pertains to new and improved color pattern and alphanumeric character generators for use with computor microprocessor-controlled television electronic game and educational devices.

In the home television electronic game field, the advent of LSI technology has made it possible to provide microprocessors for control of these known electronic games for a reasonable price. With the advent of microprocessors as controllers for television electronic games, it has become possible to expand and enrich the function of these devices. By providing for both alphanumeric and general pattern display in a variety of colors on the television screen, this enrichment became practical.

The prior art techniques for character display and display of color patterns on a cell-by-cell basis on a raster-scan CRT were developed independently of each other. Thus, there exists devices that can display characters on a raster-scan CRT or that can display color patterns on a raster-scan CRT. However, no apparatus of the type claimed herein capable of simultaneously generating both character and color patterns on a raster-scan CRT has hitherto been developed. One of the reasons for this lack of integration between a character generator and a color pattern generator is the manner in which prior color pattern generators operate. Usually, a character code is assigned to each color cell on the display area of the CRT. Several colors are preselected for the color pattern generator, and only one color selection code from these preselected colors is offered or is used to drive each character cell. The present invention overcomes these prior art difficulties by integrating a character generator and color pattern generator functions into a single simplified circuit.

OBJECTS AND SUMMARY OF THE INVENTION

An object of this invention is to provide simplified circuitry for generating an integrated color pattern and character signal for raster-scan display devices.

Another object of this invention is to provide a simplified color pattern and character-generator circuit for raster-scan CRT display devices which is readily controlled by a computer.

Yet another object of this invention is to provide a color pattern and character generator circuit for raster-scan display devices which provides a complex and easily changed color pattern and character display, said circuit being readily controlled by a computer.

These objects and the general purpose of this invention are accomplished as follows. A display RAM has a plurality of bytes stored at each character cell address location. These bytes contain both color code and character code data for that particular character cell. The color code defines all the color cells for that character cell. The color code, read from the RAM on a color cell basis, is used to address another storage area which identifies the color signals to be used for each color cell in that particular character cell. The character code read from RAM is used to address a character memory which generates the dot pattern required to produce the character on the CRT. The color signal and dot pattern are combined in a television modulator to produce an RF signal for the CRT in a typical home television receiver.

The display RAM is responsive to a RAM control circuit which inhibits a microprocessor from accessing the display RAM a brief period before the CRT display period starts until the display period is over. The microprocessor is allowed to access the display RAM at all other times. Thereby, the microprocessor is not locked out from accessing the display RAM during the entire display cycle.

BRIEF DESCRIPTION OF THE DRAWINGS

Other objects and many of the intended advantages of this invention will be readily appreciated as the same becomes better understood by reference to the following description when considered in conjunction with the accompanying drawings in which like reference numerals designate like parts throughout the figures thereof and wherein.

DESCRIPTION OF THE PREFERRED EMBODIMENTS

The present invention of a color pattern and character-generating circuit is contemplated for use in association with raster-scan display devices, and specifically, the CRT display devices used in a home television receiver. The present invention has particular utility in microprocessor-controlled TV game and educational systems that are being introduced into the consumer market. The visual field utilized by these game or educational devices take up an area on the CRT screen that is less than the total CRT viewing surface. Accordingly, the present invention will be described in conjunction with the generation of a viewing area that is less than the available viewing surface on a television CRT.

Figure 1:
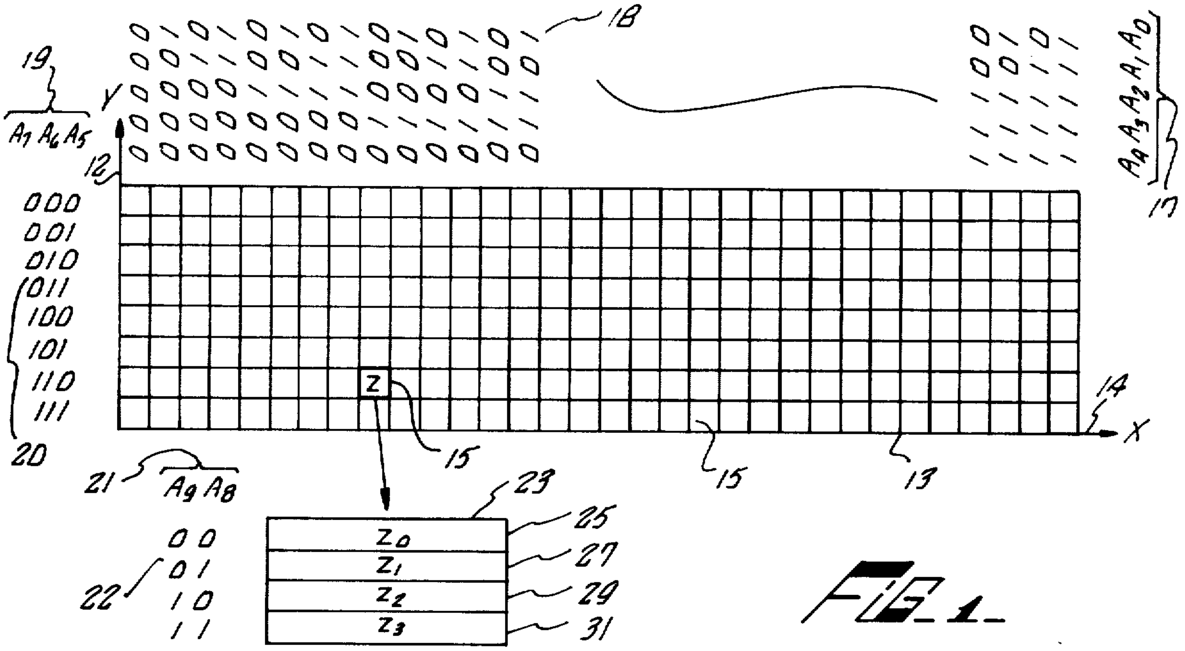
FIG. 1 is a conceptual diagrammatic illustration of the character cell organization of the viewing area on the raster-scan display device used with the present invention.

Referring first to FIG. 1, the viewing area 13 is shown as the display area of the present invention. This area is oriented in an X-Y coordinate system, the length of the viewing area being along the X axis 14, the width of the viewing area being along the Y axis 12. The entire viewing area 13 is broken up into a gridwork of character cells 15. For purposes of example, the viewing area 13 is assumed to contain thirty-two character cells per row, a row being parallel to the X axis 14, with eight rows of character cells along the Y axis 12. Thus, the viewing area 13 is divided up into 256 character cells 15.

Each character cell must be uniquely identified as to its position in the display area 13 as well as to the color pattern contained therein and any character that is to be displayed therein. In order to define these variables for each of the 256 character cells on the display area 13, a ten-bit data word is utilized. The data word can be described as having the following format:

$A_9\ A_8\ A_7\ A_6\ A_5\ A_4\ A_3\ A_2\ A_1\ A_0$

This data word is essentially broken into three parts. As illustrated in FIG. 1, data bits ($A_0$-$A_4$) form a byte 17 that defines the position of a character cell along the X axis 14. The bit combinations for the position byte 17 for each of the thirty-two character cell positions along the X axis, which is a preferred bit assignment, is illustrated at 18. Data bits $A_5$, $A_6$, and $A_7$ form a byte 19, which defines the character cell position along the Y axis 12. The preferred bit combinations for the Y axis byte 19 are illustrated at 20. Thus, the lower eight bits of the data word uniquely identify the position of each character cell 15 in the viewing area 13.

The remaining two top bits $A_8$ and $A_9$ form a byte 21 that determines the color pattern and character to be displayed in the cell 15 identified by bytes 17 and 19 with which it is associated. The preferred bit assignments for byte 21 are illustrated at 22. These bytes 21 select the color and character information stored in a display random-access memory in the form of a plurality of bytes 23.

As a preferred embodiment and for purposes of example, the color information and character information stored at each memory location address by the X and Y bytes 17 and 19 is divided into four bytes, 25, 27, 29, and 31. The color bytes $Z_0$, $Z_1$ and $Z_2$ 23, 25, and 27, respectively, contain the color pattern information for their character cell. Character byte $Z_3$ 31 contains a character code that indicates the character that is to be displayed in that particular character cell 15. Color and character byte 21 selects one of the four stored bytes $Z_0$-$Z_3$ for display purposes. This relationship will be described hereinafter.

Figure 2:
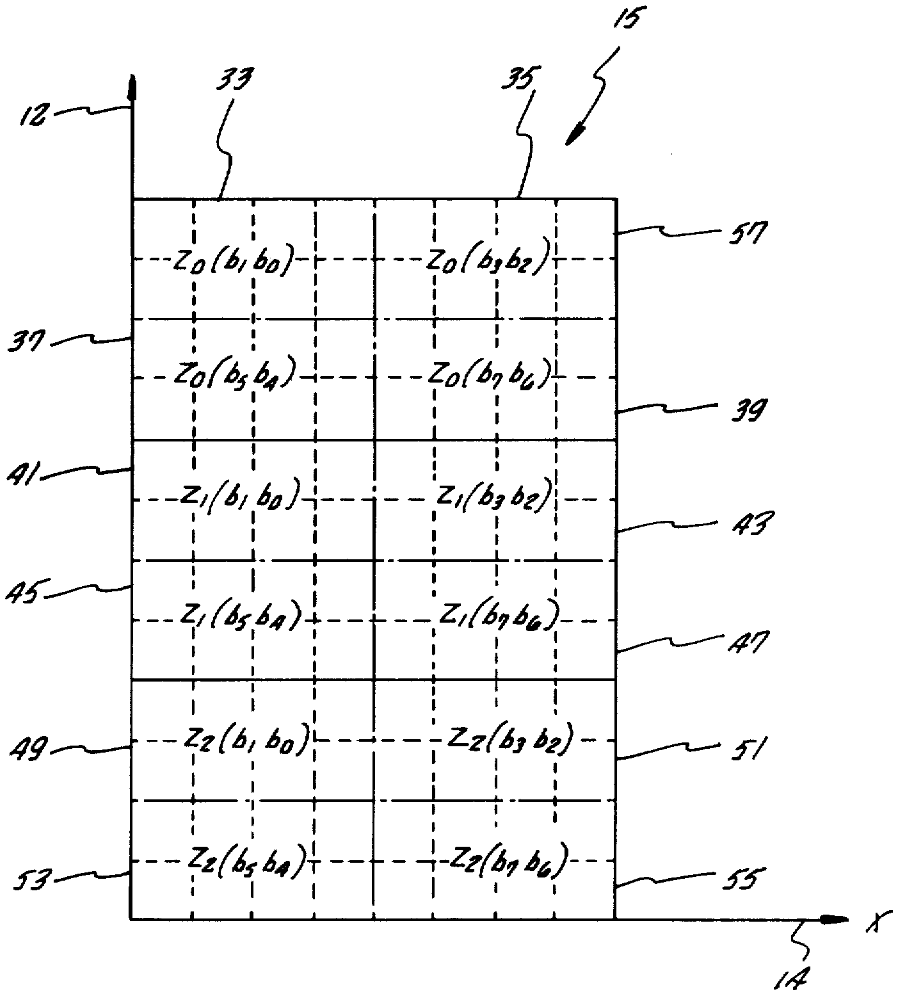
FIG. 2 is a conceptual diagrammtic illustration of a single character cell in the viewing area illustrated in FIG. 1.

Referring now to FIG. 2, each character cell 15 is divided into a plurality of color cells. For purposes of example, FIG. 2 illustrates that each character cell 15 contains twelve color cells, 33, 35, 39, 43, 47, 51, 55, 53, 49, 45, 41 and 37. Each color cell, 35 for example, is made up of a plurality of dots 57. For purposes of example, there are eight dots 57 per color cell. Thus, there are ninety-six dots per character cell 15. Each dot 57 of a character cell can be defined in terms of a dot length along the X axis 14 and a dot width along the Y axis 12, in reference to the scan lines on the CRT. A preferred dot size is a dot length of 139.7 nanoseconds on the scan line and a dot width of 4 interlaced scan lines (two even frame lines and two odd frame lines). As will be explained hereinafter, these dots are also utilized to generate a character in the character cell.

The color pattern for each character cell is determined by the twelve color cells therein. The characteristic of these color cells is defined by the three stored color bytes 25, 27 and 29, stored in a display RAM for each addressable character cell location. These color information bytes are read from memory in sequence from $Z_0$-$Z_2$. Each color byte, such as $Z_0$ byte 25 is actually an eight-bit word ($b_0$-$b_7$) 32. Each color byte, or word, defines the color characteristic of four color cells. Color word $Z_0$ defines the color of the top four color cells of a character cell. Color word $Z_1$ defines the color of the middle four color cells in the character cell. Color word $Z_2$ defines the color of the bottom four color cells in the character cell, as illustrated in FIG. 2.

Each color word 32 is made up of four two-bit bytes, thereby allowing each color cell a range of four colors. Taking the $Z_0$ color word 25, for example, which defines the top four color cells of a character cell, the lowest two bits, $b_0$, $b_1$ define the upper left color cell 33. The next two bits $b_2$, $b_3$ define the upper right color cell 35. The next two bits $b_4$, $b_5$ define the lower left color cell 37. The upper two bits $b_6$, $b_7$ define the lower right color cell 39. The color for each color cell depends on the bit combinations of the bit pairs. As the viewing area 13 (FIG. 1) is scanned by the raster-scan device of the CRT, the color words $Z_0$, $Z_1$, and $Z_2$ are read out in the appropriate sequence with the appropriate bytes of each color word, e.g., $b_0$, $b_1$ being selected at the time required for displaying the color of the dots lying on the scan line within a particular color cell.

Figure 5:
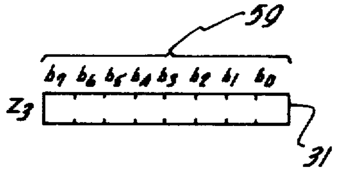
FIG. 5 is a conceptual diagrammatic illustration of the character byte which defines the character for one character cell.

The character code read from the random-access display memory is a character word 59 that is also made up of eight bits ($b_0$-$b_7$, FIG. 5). The eight-bit code of the $Z_3$ character code word 59 is utilized to address a character pattern ROM which contains 256 character patterns, each character pattern being defined by an 8 × 12 dot pattern. This dot pattern is read out of memory to generate the character desired, such as the character 61 illustrated in FIG. 4.

Figure 4:
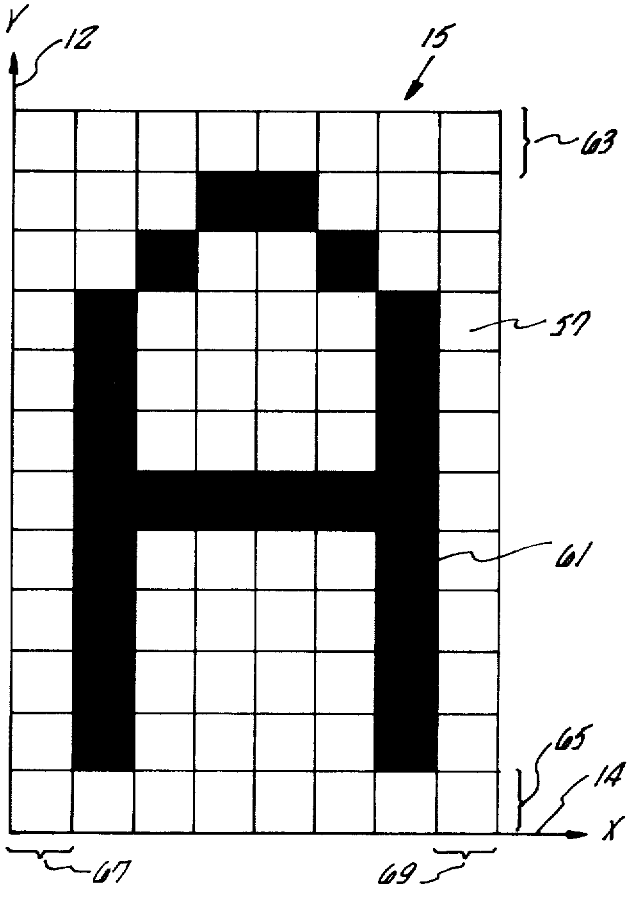
FIG. 4 is a conceptual diagrammatic illustration of a single character cell of the display area of FIG. 1 with a character displayed therein.
Figure 3:
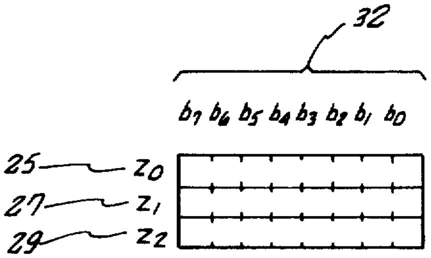
FIG. 3 is a conceptual diagrammatic illustration of the three color bytes which define the color background pattern for one character cell.

As can be seen in FIG. 4, the character cell 15 contains a character 61, the letter A, centrally located therein with at least a one-dot margin 63 at its top, a one-dot margin 65 at the bottom, and a one-dot margin 67, 69 at each of the characters displayed on the screen. The dot patterns which define the characters to be displayed are retrieved from the character pattern ROM by a combination of the $Z_3$ character word 31 and the contents of a ring counter which is synchronized to the horizontal scanning system of the CRT display device. Essentially, the eight bits of the $Z_3$ character word address the storage location of the twelve bytes of the dot pattern in the character pattern ROM. The ring counter contents, synchronized to the horizontal scanning device of the display CRT, determines the readout sequence of the dot pattern stored in ROM.

The structure and operation of the color pattern and character-generating circuitry of the present invention, which generates character and color patterns according to the above-described concept of character and color cell interrelationship, will now be described, with reference first to FIG. 6, which illustrates the invention in block diagram form, and FIG. 7, which describes the timing of the various elements of the invention in relation to each other. The major portions of the color pattern and character-generator circuit of the present invention are the display RAM 73, which contains the four character cell words $Z_0$-$Z_3$ at each addressable location therein, as defined by the two address bytes 17 and 19. In addition, a register file 87 contains color information signals therein which drive a color network 91. The register file is addressed by the color words stored in the display RAM 73.

A character generator ROM 93 has 256 characters stored therein, each character being defined by an 8 × 12 dot matrix. A particular dot matrix in the character generator ROM 93 is read out in response to being addressed by a character word from the display RAM 73 and a row-selection code from the TV Sync and timing generator 81.

The dots read out of the character ROM are supplied to a video network 97. The output from the color network 91 and the video network 97 is supplied to a standard modulator, which produces a modulated RF signal, which is then supplied to the television receiver RF section and, ultimately, is displayed on the CRT screen.

Figure 6:
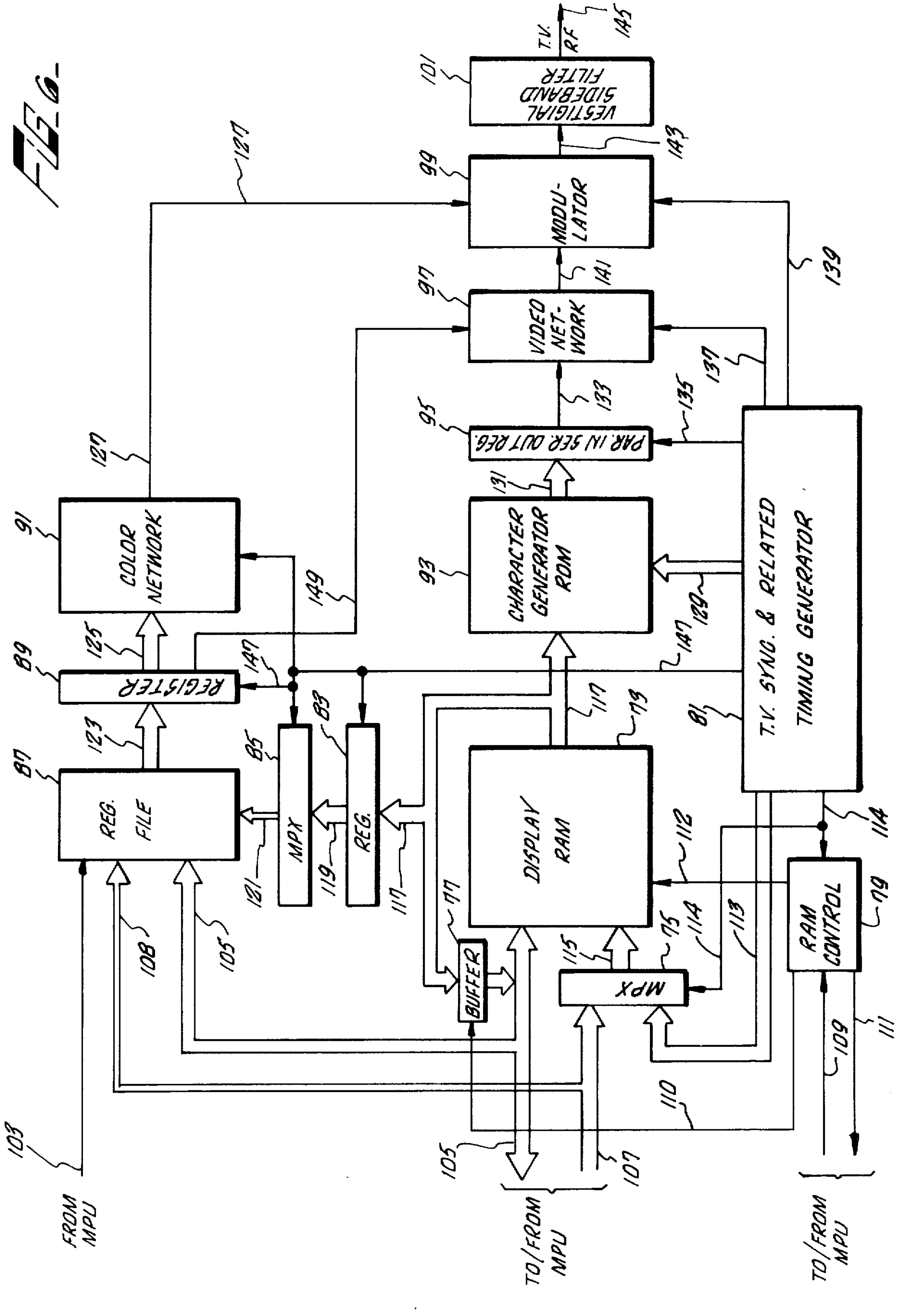
FIG. 6 is a block diagram illustration of the character and color pattern display generator of the present invention.
Figure 7:
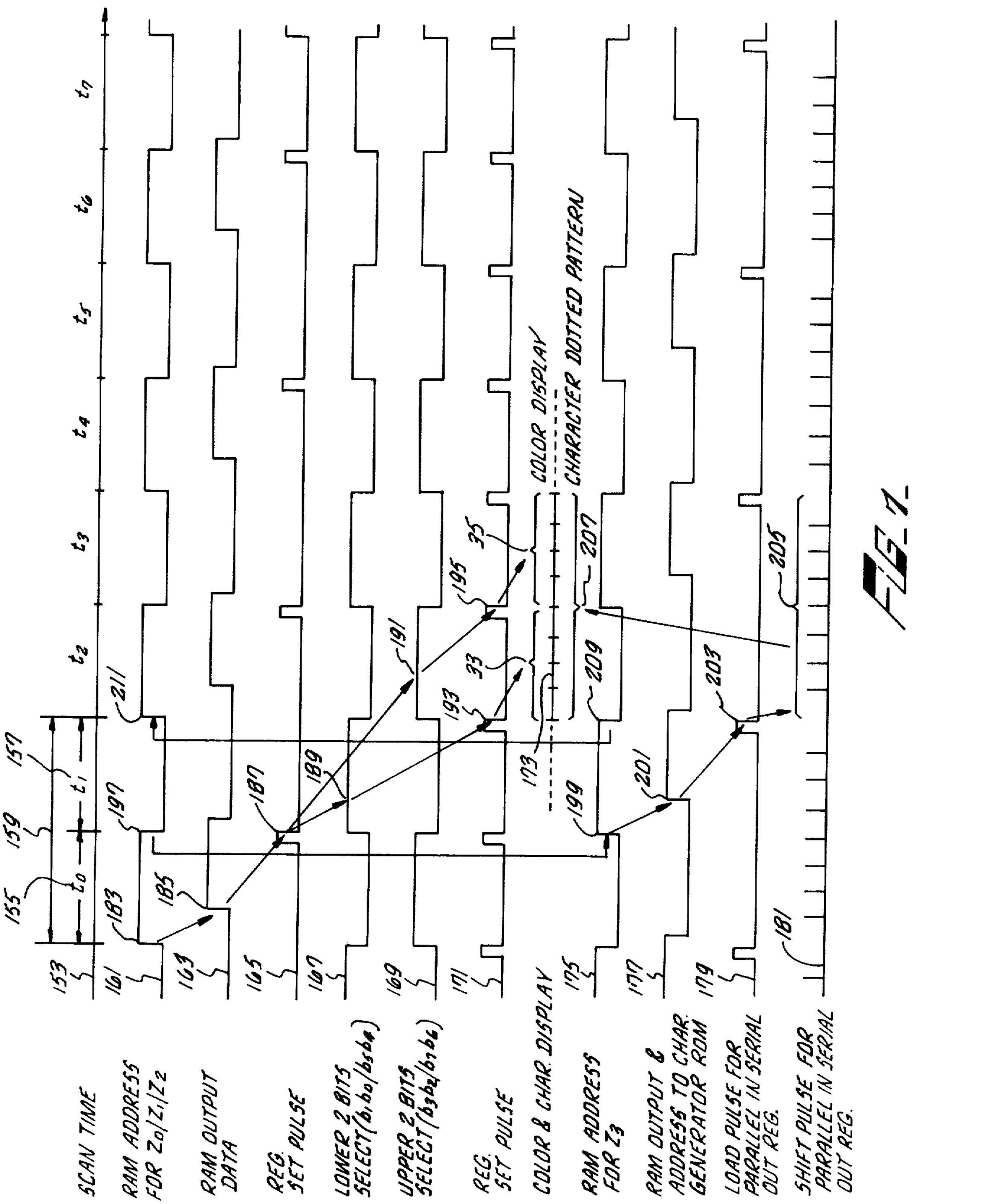
FIG. 7 is a timing diagram illustrating the timing relationship between the various components of the block diagram of FIG. 6.

The structure illustrated in FIG. 6 of the present invention is designed to interface between a microprocessor unit (not shown) and a home television receiver (not shown). The microprocessor unit communicates with the apparatus illustrated in FIG. 6 by sending appropriate addresses for display RAM 73 over address bus 107. Information from the microprocessor to the display RAM 73 or to the microprocessor from the display RAM 73 is communicated over data bus 105.

Various control lines also interconnect the microprocessor and the circuitry of FIG. 6. Thus, register file write-control line 103 would carry a signal from the microprocessor whenever color-formatting signals are to be stored in register file 87, as dictated by the data sent from the microprocessor over data bus 105. In addition, the microprocessor transmits signals to RAM control circuit 79 over control lines 109, which would cause the RAM 73 to either read out the information at the addressed location or read in the information supplied to it at the designated address location. In turn, RAM control 79 generates a ready signal to the microprocessor on line 111 to indicate that the microprocessor may have or may not have access to display RAM 73.

Display RAM 73 is a standard, well-known, preferably solid-state random-access memory of a size sufficient to store the color and character words required to characterize the color and character of each character cell utilized on the CRT raster-scan display device. The lower eight bits of the data word, supplied to display RAM 73 over address bus 115 (the output of multiplexer 75), make up the X and Y bytes of the address word and define the addressable location of the color and character words for a particular character cell. At this addressable location is located the four character cell description words $Z_0$-$Z_3$. One of these four character cell description words is chosen in response to the top two bits of the address word on bus 115. The timing relationship between the lower eight bits of address and the upper two bits of address, in the context of accessing the display RAM 73, for the purpose of displaying a character and color pattern on the CRT screen (not shown), will be more clearly described in conjunction with the timing diagram of FIG. 7.

The display RAM 73 communicates either with the microprocessor unit or is supplying information to the CRT display device as directed by the TV Sync and timing generator 81. Data is written into display RAM 73 only by the microprocessor over data bus 105 in the storage location dictated by the address word on address bus 107. Whenever the microprocessor wants to write data into the display RAM 73, it sends a signal to RAM control 79 over lines 109, an address on bus 107 and the data on bus 105. If timing generator 81 is not addressing RAM 73, the signal on line 114 connects input bus 107 to multiplexer 75 to output bus 115. The RAM control 79 instructs the RAM 73 with a write control over lines 112.

The microprocessor may also read data from the display RAM 73. This is accomplished by transmitting a read and RAM select signal on lines 109 to the RAM control circuit 79, which provides a RAM read signal on line 112 to the display RAM 73 and, in addition, provides a data output signal on line 110 to the buffer 77. Consequently, the address supplied by the microprocessor unit 107 dictates the addressable location from which the display RAM 73 will read out its information over output bus 117 into buffer 77 and, in turn, to microprocessor data bus 105.

Whenever the CRT display device requires information from the display RAM 73, the TV Sync and timing generator 81 transmits a signal to RAM control circuit 79 over line 114. This signal causes the RAM control 79 to generate a microprocessor access-inhibit signal on line 111. As will be explained hereinafter, this signal prevents the microprocessor from accessing the display RAM at this time. The RAM display signal on line 114 is also supplied to multiplexer 75, which switches the ten-bit data word generated by circuit 81 on bus 113 to address input bus 115 of the display RAM 73.

In response to the ten-bit data word supplied to bus 115 by the TV Sync and timing-generator circuit 81, the display RAM 73 will read out over the eight-bit output bus 117 one of the four code bytes $Z_0$-$Z_3$, depending on the upper two bits of the address word. The relationship between the readout of the color code bytes, $Z_0$, $Z_1$, and $Z_2$, on output bus 117 and the character code bytes $Z_3$ on output bus 117 will become more readily apparent hereinafter when the timing relationships of FIG. 7 are explained. Suffice it to say for the present, the color code bytes, $Z_0$, $Z_1$, and $Z_2$ are read out during the even time periods, and the character code byte $Z_3$ is read out during the odd time periods, defined by raster-scan time 153 of FIG. 7.

Assume now, for purposes of explanation, that a color code byte such as $Z_0$ has been read out on the output bus 117 of display RAM 73 in response to a request by the TV Sync and timing-generator circuit 81. This color code byte is loaded into register 83 in response to a command signal on lines 147 from the timing-generator circuit 81. The portion of the contents of register 83 is selected by multiplexer 85, which is fed by bus 119 in response to control signals on lines 147. Multiplexer 85 selects the two-bits of the color code byte described in conjunction with FIG. 2 as determined by the signals on lines 147, which is synchronized to the scan timing of the raster-scan display screen.

The two bits of the color code byte selected address register file 87 over two-bit bus 121. In turn, register file 87 reads out one of four color information words stored therein over output bus 123 into register 89. The color information words read out of register file 87 contain an intensity byte and a color byte, the intensity byte being three bits long and the color byte being five bits long. The color byte is passed on to the color network 91 over bus 125, and the intensity byte is passed to the video network 97 over lines 149.

The data structure of the register file can be illustrated as follows:

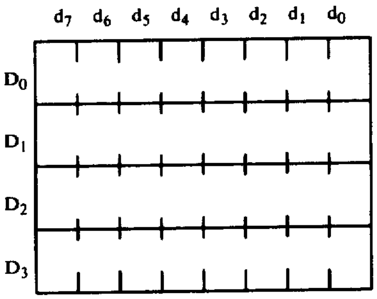

There are four color words $D_0$, $D_1$, $D_2$, and $D_3$ stored therein. Each color word is made up of eight bits $d_0$ to $d_7$. The lower five bits $d_0$ to $d_4$ are the color bits and the upper three bits $d_5$ to $d_7$ are the intensity bits. The selection of colors that may be stored in register file 87 in this format is illustrated in the table below.

| $d_7$ | $d_6$ | $d_5$ | $d_4$ | $d_3$ | $d_2$ | $d_1$ | $d_0$ | Meaning |
|---|---|---|---|---|---|---|---|---|
| X | X | X | 1 | 1 | 0 | 0 | 1 | Red |
| X | X | X | 1 | 1 | 0 | X | 0 | Orange |
| X | X | X | 1 | 1 | 1 | 0 | 1 | Yellow |
| X | X | X | 0 | 1 | 1 | 0 | 1 | Green |
| X | X | X | 0 | 1 | 1 | 1 | 1 | Cyan |
| X | X | X | X | 0 | 0 | 1 | 1 | Blue Cyan |
| X | X | X | 0 | 1 | 0 | 1 | 1 | Blue |
| X | X | X | 1 | 1 | 0 | 1 | 1 | Magenta |
| X | X | X | 1 | 1 | 1 | 1 | 1 | Gray |
| X | X | 0 | 1 | 1 | 1 | 1 | 1 | White |
| X | 0 | 1 | X | X | X | X | X | Light |
| 0 | 1 | 1 | X | X | X | X | X | Dark |
| 1 | 1 | 1 | X | X | X | X | X | Black |

Note: X Don't Care

Although only four color words $D_0$–$D_3$ are resident in the register file 87, at any time, the contents of the register file may be changed by the microprocessor. The color network 91, which receives the five color bits over bus 125, is basically an analog decoder of the five-bit color bytes supplied to it. It generates color vector signals B-Y, R-Y, and the chroma reference on lines 127 to the modulator 99. The preferred structure for this color network will be described hereinafter.

Assuming now that the information read from display RAM 73 is a character word $Z_3$, such character word is supplied on output bus 117 to character generator ROM 93. The character word addresses a dot matrix stored in the character ROM 93, which describes a particular character. A row selection signal, preferably four bits wide, is supplied by the TV Sync and timing-generator circuit 81 over bus 129 to select the row of the matrix which is to be read out in parallel over output bus 131 to parallel-in, serial-out register 95. Register 95 is loaded upon the command signal being received from the timing generator 81 over line 135. The output of the parallel-in, serial-out register 95 is a serial string of digital data or dots on line 133 to the video network 97.

In addition to the intensity byte received over lines 149, the video network 97 receives a composite sync signal over line 137 from the sync timing generator 81. The video network 97 functions basically to generate a composite video signal on line 141 to the modulator 99. A preferred structure for the video network will be described hereinafter.

The modulator 99 is a well-known device and may be a National Semiconductor LM-1889 TV modulator. The output signal of the modulator 99 on line 143 is the result of the signals received on line 127, which are analog color signals, the composite video signals on line 141, and the reference signals received on line 139, which are chroma-lead and chroma-lag signals. The modulator generates an RF-modulated signal to vestigial sideband filter 101, the output of which is supplied over line 145 to a television radio frequency section. This RF signal contains both character and color pattern information in a form utilizable by the television receiver to display both a color pattern and character on the screen.

The timing interrelationship between the CRT raster-scan display device and the generation of the character and color pattern signals will now be explained in conjunction with the timing diagrams of FIG. 7. The time scale of FIG. 7 is the scan time 153 which is determined by the time it takes an electron beam to scan the length (X axis) of the CRT display. The time periods $t_0$, $t_1$, $t_2$ . . . etc., are equivalent to the amount of time it takes to display four dot lengths on a CRT raster line. Thus, it takes two time periods, such as $t_0$ 155 and $t_1$ 157, to display one line 159 of a particular character cell.

Assuming now that a particular character cell is addressed in display RAM 73 and that character cell contains both color pattern and character information, the circuit of the present invention, as shown in FIG. 6, would operate substantially as follows.

The RAM address would be supplied through multiplexer 75 by the TV Sync and timing generator 81. This RAM address would define the addressable location of the four words describing the particular character cell, words $Z_0$, $Z_1$, and $Z_2$ presenting the color patterns therein, and word $Z_3$ being the character code of the character therein. Thus, at the start of time period $t_0$ 155, the color words 161 as well as the character word 175 are addressed. However, the color words $Z_0$, $Z_1$, and $Z_2$ are read out of RAM 73 first at time 183 as a result of a RAM address control signal as determined by the color bytes. Therefore, RAM output data 163 of a color word is placed on the output bus 117 at time 185.

Whether this output data is color word $Z_0$, $Z_1$, or $Z_2$ depends on which raster line is being scanned on the CRT screen and is dictated by the TV Sync and timing-generator circuit 81. At the end of time period $t_0$ 155, the color word read out of display RAM 73 is fed into register 183 by the register-set pulses 165, and specifically, pulse 187, which is generated by the TV Sync timing-generator circuit 81. Multiplexer 85 selects one of the four two-bit bytes in the eight-bit color word stored in register 83, depending on the signals 167 and 169 supplied to it by the TV Sync and timing generator 81. Signal 167 selects the bits representing the two left-hand side color cells defined by a particular color word. Signal 169 selects the two color bytes representing the two right-hand color cells of the particular color word selected. Whether the upper or lower two bits, such as byte $b_1b_0$ or byte $b_5b_4$, is selected depends again on the raster line being scanned. Thus, either $b_1b_0$ or $b_5b_4$ is selected to address register file 87 during time period $t_1$ 157 at 189, and either $b_3b_1$ or $b_7b_6$ are selected to address register file 87 at time period $t_2$ at 191.

The output of register file 87, as determined by the addresses supplied to it over two-bit bus 121, is clocked into register 189 by register set pulses 171. Pulse 193 sets in the outputs in response to the $b_1b_0$ or $b_5b_4$ addresses. Pulse 195 sets on the outputs in response to the $b_3b_1$ or $b_7b_6$ addresses. As soon as the output of register file 87 is set into register 189, it is supplied to color network 91 over data bus 125 and, consequently, generates a color display for the particular raster line on the character cell being displayed. Thus, the $b_1b_0$ or $b_5b_4$ address generates a segment 33 of a color line 173, which represents a left-hand color cell in the character cell being displayed. The $b_3b_2$ or $b_7b_6$ address generates the segment 35 of color line 173, which represents the right-hand color cell of the character cell being displayed.

At the same time that the color pattern is being displayed, a character would also be displayed as follows. At the finish of the RAM address control signal 161 at time 197, RAM address control signal 175 at time 199, which is at the end of the $t_0$ time period 155, causes display RAM 73 to read out over output bus 177 at time 201. The character word 177 is used to address character generator ROM 73 as supplemented by the address supplied by TV Sync and timing generator circuit 81 over bus 129. The character matrix addressed in character ROM 93 is read out in parallel, line by line, over output bus 131, as determined by load pulses 179, supplied over line 135 to the parallel-in/serial-out register 95. The output generated at time 201 is loaded in the parallel-in/serial-out register 95 at time 203. At this time, it is the end of $t_1$ period 157 at 209, and the display RAM 73 is instructed by RAM address signal 161 at time $t_2$ to read out another color word. The output of the parallel-in/serial-out register 95 is a series of bits which are shifted out by shift pulses 181 into the video network 97. These bits at time 205 are displayed on the CRT on the particular raster line segment 207 designated for a particular character cell. In this manner, the color pattern and character is being generated for simultaneous display on the CRT screen.

Figure 8:
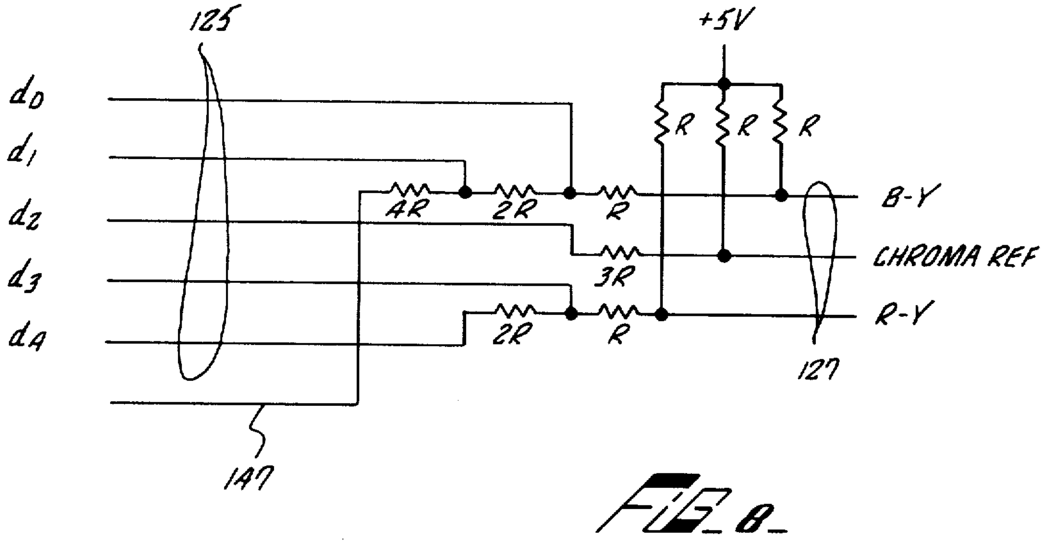
FIG. 8 is a schematic of the color network illustrated in block form in FIG. 6.

The color network 91, as a result of the data format in the register file 87, has a preferred, simplified embodiment which is illustrated in FIG. 8. The network is, in essence, a passive analog color-decoder network. The network operates as a color vector generator. In response to the five bits $d_0$, $d_1$, $d_2$, $d_3$, $d_4$ from the register file 87 and the phase reference signal on line 147, the color network circuit generates, at its output lines 127, analog signals that represent the colors to be modulated by modulator 99. For example, if the B-Y signal is positive and the R-Y signal is zero, the color represented would be blue. If the B-Y signal is zero and the R-Y signal is positive, the color represented would be red. The chroma reference represents the zero level for the B-Y, R-Y signals.

Figure 9:
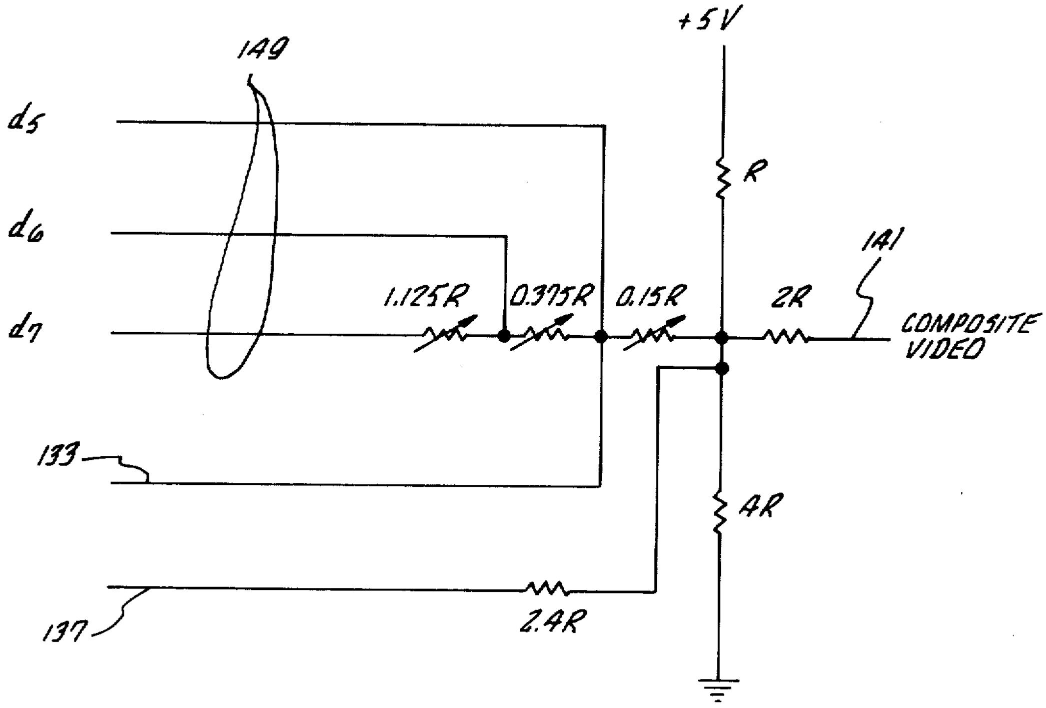
FIG. 9 is a schematic of the video network illustrated in block form in FIG. 6.
Figure 11:
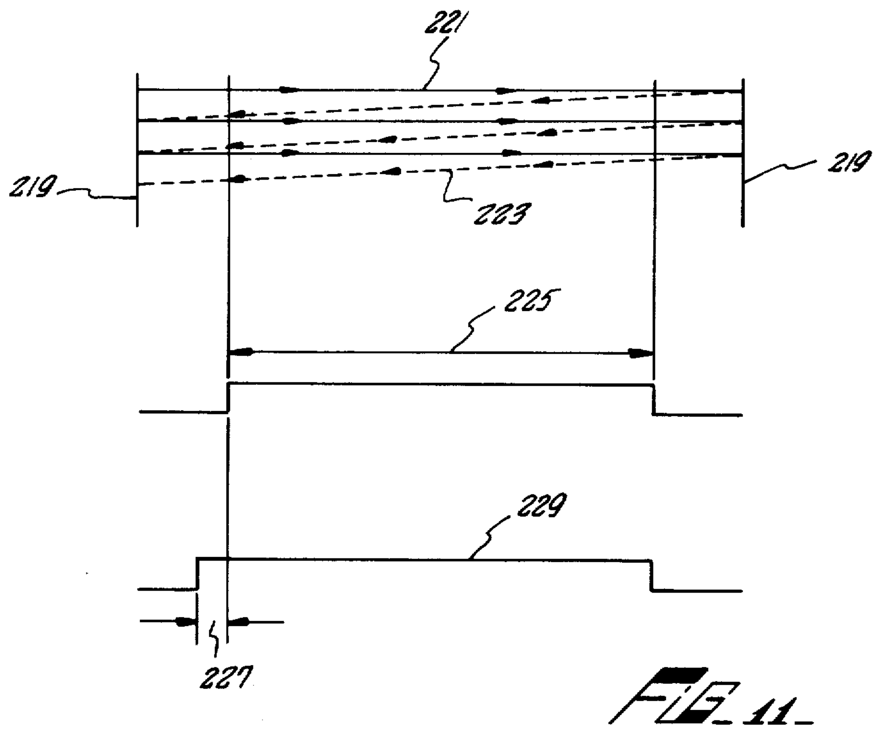
FIG. 11 is a timing diagram of some of the signal relationships of the RAM control circuit of FIG. 10.

The video network 97 is illustrated in preferred form in FIG. 9. It receives the three intensity bits from register 89 over lines 149, and is again a passive resistor network. It generates a composite video signal on line 141 to the modulator 99. This video signal is simply a voltage level which is increased or decreased in relation to the intensity directed by the three bits $d_5$, $d_6$, $d_7$. In addition, the video network receives the dot patterns from the parallel-in/serial-out register 95 on line 133 and a composite sync signal as a reference for the dot signals on line 137.

Figure 10:
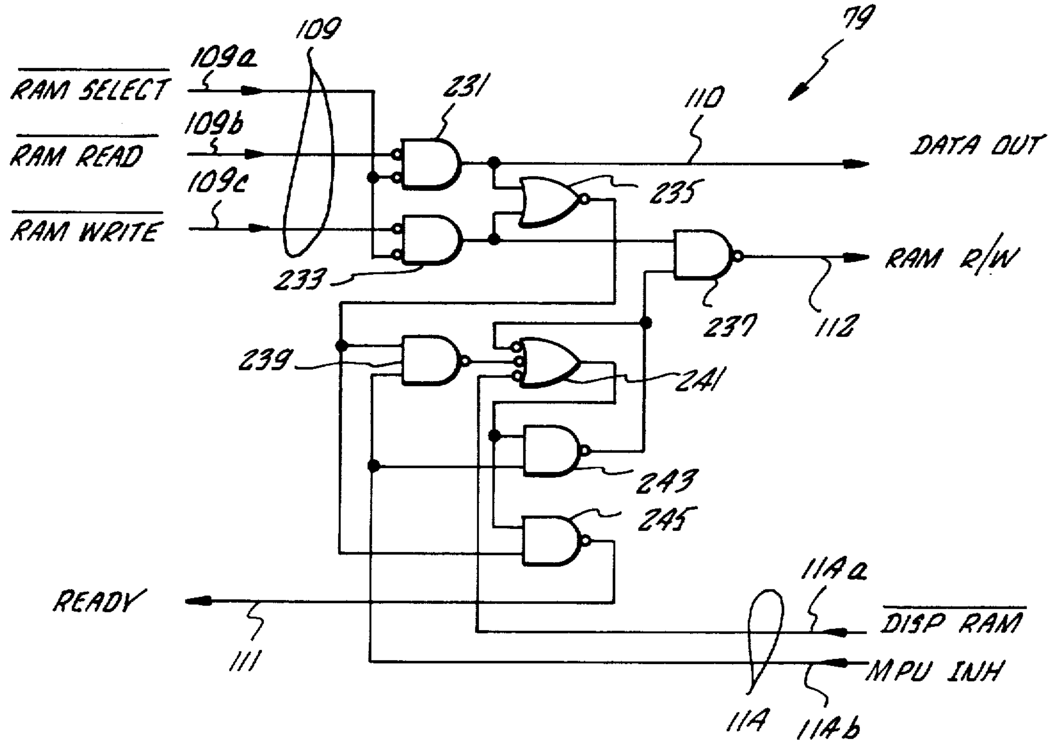
FIG. 10 is a logic diagram illustrating the preferred form of the RAM control circuit illustrated in block in FIG. 6.

The preferred embodiment of the RAM control circuit 79 of FIG. 6 is illustrated in FIG. 10. It comprises a logic circuit which receives a RAM select signal, a RAM read and a RAM write signal from the microprocessor unit over lines 109, and in response thereto, generates a data-out signal on lines 110 to buffer 77 (FIG. 6), a RAM read/write control signal on lines 112 to the RAM 73, and a microprocessor-access signal on line 111 to tell the microprocessor that it may or may not have access to the display RAM 73. The microprocessor-access signal on line 111 is additionally dependent on signals from the timing-generator circuit 81 over lines 114, which include a microprocessor-inhibit signal and a display RAM signal.

The RAM control circuit of FIG. 10 insures that the microprocessor unit does not get access to the display RAM 73 during the time that the RAM 73 is being accessed for display purposes. This is determined by the signal supplied to the microprocessor unit over the microprocessor access line 111.

As was noted, the viewing field is smaller than the display surface of the CRT screen, which can be defined as having left and right boundaries 219 and 220, respectively.

The CRT screen is scanned by raster lines 221, the dash lines 223 representing the blanked return of the scan. The display RAM 73 of FIG. 6 is not utilized during the entire scanning period of raster lines 221 from left boundary 219 to right boundary 220. It is utilized only for a portion thereof, as shown by display period 225. For purposes of illustration, this signal duration may be 35.76 microseconds, which is a little more than half of the 63.56 microseconds it takes for one raster line to be scanned from left to right on the CRT screen.

The RAM control circuit of the present invention, contrary to prior art control circuits which lock out the computer from memory during the entire scan cycle, only locks out the computer during the time that the display is actually taking place on the screen—that is, during the 35.76 microsecond display period 225. However, in order to prohibit the computer from accessing memory just prior to the start of the display period, a buffer area 227 of 1.12 microseconds, for example, is provided. Thus, the entire lock-out period for the microprocessor is illustrated by the microprocessor-inhibit period 229, which is 36.88 microseconds. The remaining portion of the scanning cycle, then, is available to the microprocessor to access the display RAM 73 and is ample for the microprocessor to perform a read or write operation.

The above-described function of the RAM control circuit of FIG. 10 is accomplished as follows. When the microprocessor wishes to access the display RAM 73, it transmits a signal over RAM select line 109*a* and a signal over RAM read line 109*b* or RAM write line 109*c*, depending on whether it wishes to read or write information. Assuming for the present that the microprocessor wishes to read information from the display RAM 73, it would transmit a signal over line 109*b*. It is received by AND gate 231, and since the RAM select signal was also supplied, AND gate 231 would generate a signal on line 110 to buffer 77 (FIG. 6), which would accept the data read out from memory and transmit it to the microprocessor data bus. The output of AND gate 231 on line 110 is also supplied as an input to OR gate 235, which responds by generating an output signal thereon, which is supplied to AND gate 239 and AND gate 245. The output of AND gate 239 depends on whether the other input to the AND gate on line 114*b*, which is the MPU inhibit signal, indicates that a display device is also requesting access to the memory. If it is not, AND gate 239 will generate a signal to OR gate 241.

If the signal on line 114*a*, which is another input to OR gate 241, is not indicating that the display RAM 73 is being accessed for display purposes, OR gate 241 generates a signal, which is applied as an input to AND gate 243 and to AND gate 245. Assuming that the other input to AND gate 243 is still indicating that the MPU inhibit signal on line 114b has not changed condition, the output of AND gate 243 would be supplied to AND gate 237. The other input to AND gate 237 has not changed state and, therefore, the output of AND gate 237 would indicate that a read operation is desired. On the other hand, if the write operation had been desired, AND gate 233 would have directed a change of state to the input of the AND gate 237, and the output of AND gate 237 would have indicated a write operation. The other AND gate 245 responds to the output of OR gate 241 and the output of OR gate 235 to generate a microprocessor-access signal on line 111. From the above explanation, it can be seen that each time the microprocessor requests access, whether it is a write operation or a read operation, such access is conditioned on whether the display apparatus is getting ready to request access or is requesting access, these states being indicated on lines 114a and 114b.

What has been described is a simplified circuit for generating an integrated color pattern and character signal for raster-scan display devices which provides a complex and easily changed color pattern and character display which is readily controlled by a computer. Various modifications are contemplated, and they obviously will be resorted to by those skilled in the art without departing from the spirit and scope of the invention, as hereinafter defined by the appended claims, as only preferred embodiments thereof have been disclosed.

What is claimed is:

1. A color pattern and alphanumeric character generating circuit for use with a raster-scan display device, said generating circuit comprising:
   - means for storing pattern and character display codes at addressable locations therein, each addressable location in said storing means containing a color code byte or a character code byte, said character code byte defining a particular character to be displayed in a character cell on said raster-scan display, and said color code byte defining the color pattern for a portion of the character cell on said raster-scan display;
   - means responsive to the addressed color code bytes in said storing means for displaying the designated color pattern in its respective character cell area; and
   - means responsive to the character code bytes in said storing means for displaying the designated character in its respective character cell area at the same time the color pattern is being displayed.

2. The circuit of claim 1 wherein said means for storing color and character display codes stores three color code bytes for each character code byte, said three color code bytes defining the color pattern for a single character cell.

3. The circuit of claim 2 wherein each character cell on said raster-scan display is divided into twelve equal size color cells and each color code byte in said storing means defines a respective four color cells within a character cell.

4. The circuit of claim 3 wherein each color cell on said raster-scan display is defined by a $2 \times 4$ dot matrix.

5. The circuit of claim 1 wherein said means responsive to the color code bytes stored in said storing means comprises means addressable by the color code bytes for storing color information bits.

6. The circuit of claim 5 wherein the color information bit storing means stores one multi-bit byte of color information at each addressable location therein, each byte containing color and intensity information.

7. The circuit of claim 6 wherein the bytes of color information stored in the color signal storing means each contain eight binary bits, five of the bits representing color information, three of the bits representing intensity information.

8. The circuit of claim 5 wherein said means responsive to the color code bytes stored in said storing means comprises means responsive to the color information bits stored in the color information bits storing means for generating analog color signals for use by an RF modulator.

9. The circuit of claim 1 wherein said means responsive to a character byte stored in said storing means comprises means addressable by the character byte for storing character dot patterns of a character repertoire to be displayed.

10. The circuit of claim 9 wherein said means responsive to the character byte stored in said storing means comprises means responsive to the dot patterns stored in the dot pattern storing means for generating a video signal for use by an RF modulator.

11. The circuit of claim 10 wherein said means responsive to the color code bytes stored in said storing means comprises means addressable by the color code bytes for storing color information bits.

12. The circuit of claim 11 wherein the color signal storing means stores one byte of color information at each addressable location therein, each byte containing color and intensity information.

13. The circuit of claim 12 wherein the bytes of color information stored in the color signal storing means each contain eight binary bits, five of the bits representing color information, three of the bits representing intensity information.

14. The circuit of claim 1, including a computer for accessing said means for storing color and character display codes and a control circuit for controlling said means for storing color and character display codes, said control circuit comprising:
   - means responsive to said raster-scan display device for generating an access-inhibit signal to said computer whenever said raster-scan display device requires access to said memory and said computer has requested access to said memory; and
   - means responsive to said raster-scan display device terminating its access requirement to said memory for terminating the access-inhibit signal to said computer.

15. The random-access memory-control circuit of claim 14 wherein the information contained in said random-access memory is to be displayed on less than the total viewing screen of said raster-scan display device.

16. The random-access memory-control circuit of claim 15 wherein said generating means generates an access-inhibit signal to said computer a relatively short time interval before the display area on the display device is reached by the raster scan in said display device, and wherein said terminating means terminates said access-inhibit signal to said computer when the raster scan goes beyond the display area on said device.

17. A random-access memory-control circuit, for use with a random-access memory, being accessed by a computer and a device having a higher access priority than said computer, said memory-access control circuit comprising:

means responsive to said device, having higher access priority for generating an access-inhibit signal to said computer whenever said device requires access to said memory and said computer has requested access to said memory; and means responsive to said device terminating its access requirement to said memory for terminating the access-inhibit signal to said computer.

18. The random-access memory-control circuit of claim 17 wherein said device, having a higher access priority, is a raster-scan display device, and said random-access memory contains information to be displayed on said display device.

19. The random-access memory-control circuit of claim 18 wherein the information contained in said random-access memory is to be displayed on less than the total viewing screen of said raster-scan display device.

20. The random-access memory-control circuit of claim 19 wherein said generating means generates an access-inhibit signal to said computer a relatively short time interval before the display area on the display device is reached by the raster scan in said device, and wherein said terminating means terminates said access-inhibit signal to said computer when the raster scan goes beyond the display area in said device.

* * * * *